United States Patent [19]
Scherubel et al.

[11] Patent Number: 5,854,180
[45] Date of Patent: Dec. 29, 1998

[54] ENVIRONMENTALLY IMPROVED ACID CORROSION INHIBITOR

[75] Inventors: Gary A. Scherubel, St. Louis, Mo.; Robert Reid, Alton, Ill.; Allen R. Fauke; Kevin Schwartz, both of St. Louis, Mo.

[73] Assignee: Clearwater, Inc., Pittsburgh, Pa.

[21] Appl. No.: 47,208

[22] Filed: Mar. 24, 1998

[51] Int. Cl.$^6$ .............................. C23F 11/10; C09K 15/04; E21B 41/02
[52] U.S. Cl. .................. 507/203; 507/239; 507/246; 507/260; 507/261; 507/265; 507/266; 507/267; 507/268; 106/14.41; 116/902; 116/113; 252/388; 252/389.53; 252/389.54; 252/392; 252/396
[58] Field of Search ................. 252/388, 389.53, 252/389.54, 392, 396; 507/239, 246, 260, 261, 265, 266, 267, 268, 203; 166/902, 113; 106/14.05, 14.41; 422/12, 16

[56] References Cited

U.S. PATENT DOCUMENTS

| | | | |
|---|---|---|---|
| 3,077,454 | 2/1963 | Monroe et al. | 252/148 |
| 3,514,410 | 5/1970 | Engle et al. | 252/87 |
| 4,823,874 | 4/1989 | Ford | 166/279 |
| 5,013,483 | 5/1991 | Frenier et al. | 252/396 |
| 5,120,471 | 6/1992 | Jasinski et al. | 252/389.54 |
| 5,366,643 | 11/1994 | Walker | 507/247 |
| 5,591,381 | 1/1997 | Walker | 252/389.54 |

*Primary Examiner*—Shean C. Wu
*Attorney, Agent, or Firm*—William L. Krayer

[57] ABSTRACT

Corrosion is inhibited in hydrochloric acid solutions used to acidize wells, by adding to the solutions a corrosion inhibiting composition comprising cinnamaldehyde or a substituted cinnamaldehyde together with a reaction product of a $C_{3-6}$ ketone such as acetophenone, thiourea or a related compound, formaldehyde and hydrochloric acid.

13 Claims, No Drawings

ENVIRONMENTALLY IMPROVED ACID CORROSION INHIBITOR

TECHNICAL FIELD

This invention relates to environmentally improved compositions and methods for inhibiting the corrosion of piping, pumps and other metal articles which could otherwise occur from contact with highly acidic solutions used in acidizing oil wells and the like.

BACKGROUND OF THE INVENTION

It is well known to "acidize" hydrocarbon-containing underground formations. When acidizing is performed, the formation may already be fractured or may become fractured under pressure from the acidizing solution itself. In either case, a highly acid solution is forced into the fractures and fissures to etch or otherwise enlarge them, generally increasing permeability and tending to form channels. The channels thus formed can remain to transport the desired hydrocarbons from the formation even after the fissures tend to close due to the natural weight and settling of the formation.

The acidizing solutions typically contain, for example, 15% hydrochloric acid, and accordingly present a harsh environment for the pumps, pipes, well casings, and other metal parts which contact them. The art has long sought additives for the acidizing solutions which not only will be effective at inhibiting corrosion but also will not increase the environmental risks of the process.

Many prior art compositions contain amines, quaternaries, acetylenic alcohols, and/or phenol ethoxylate surfactants, all of which have been seen as environmentally objectionable. We therefore have striven to design a corrosion inhibitor which is free of such materials.

In U.S. Pat. No. 3,077,455, Monroe describes an early "reaction product" inhibitor made from, for example, thioruea, acetophenone, and formaldehyde in the presence of HCl and tall oil. Aldehydes are suggested by Engle and Keeney for acid corrosion inhibiting in U.S. Pat. No. 3,514,410.

Ethylene glycol and methanol are used together with an antisludging agent by Ford, as described in U.S. Pat. No. 4,823,874, for acidizing treatments.

Cinnamaldehyde is combined with a quaternary salt of a nitrogen-containing heterocyclic aromatic compound, in U.S. Pat. No. 5,120,471 to Jasinski et al. Such a quaternary salt is environmentally undesirable. Jasinski et al recite a list of derivatives and variations of cinnamaldehyde which appear to be useful in the context of their invention.

Frenier et al, in U.S. Pat. No. 5,013,483, in Example 1, prepares 2-benzoyl-1,3-dimethoxy propane by reacting acetophenone and formaldehyde in the presence of hydrochloric acid. The product is used as a comparative for corrosion testing of 2-benzoyl-3-methoxy-1-propene, which is a subject of the '483 invention; the saturated product performs less well than the propene derivative, in the context of the tests.

Thiourea, acetophenone, formaldehyde and hydrochloric acid are included by Walker, in U.S. Pat. No. 5,366,643, in a reaction with a fatty acid designed to make a reaction product to be used, with antimony, as a component of a corrosion inhibitor for acidizing solutions. Column 8, line 63 to column 9 line 5; however, the reaction product is effective by itself as a corrosion inhibitor—column 3, lines 50–57.

While some of the compositions of the prior art have achieved a degree of effectiveness against corrosion, they are environmentally questionable. The art is still in need of an effective corrosion inhibitor for acidizing solutions which is also environmentally benign.

SUMMARY OF THE INVENTION

We have invented a new composition and method for inhibiting the corrosion which otherwise would be caused by acid solutions in acidizing wells. The composition and method employ no quaternary amines, no acetylenic alcohol, no formaldehyde, and no phenol ethoxylate surfactants, all of which are common ingredients in prior art acidizing corrosion inhibitors.

Our preferred composition has two basic components— (1) a reaction product of acetophenone, thiourea, formaldehyde, and hydrochloric acid, the reaction being conducted in the presence of ethylene glycol and the reaction product being carried in isopropanol as a solvent (2) additives comprising cinnamaldehyde, ethylene glycol, and Neodol 91.8. The preparation of the composition is explained in some detail below. Our method includes incorporating a small amount of our composition into the acidizing solution and acidizing a formation with the acidizing solution.

DETAILED DESCRIPTION OF THE INVENTION

In particular, our invention includes the following preferred composition, within the ranges of percentages by weight indicated below:

| Preferred Composition | | |
|---|---|---|
| Preferred | Material | Range |
| 15% by weight | Cinnamaldehyde | 10 to 30% |
| 15% | NEODOL 91.8* | 5 to 20% |
| 40% | Ethylene Glycol | 25 to 50% |
| 15% | Formic Acid | 10 to 30% |
| 10% | Water | 5 to 25% |
| 5% | Composition A** | 1 to 15% |

*NEODOL 91.8 is a trademark of Shell Chemical Company; the composition is a mixture of $C_9$ to $C_{11}$ alcohols having an average molecular weight of 160. The alcohols include an average of 8.3 moles of ethylene oxide.
**Composition A is made according to the recipe described below.
Preparation of Composition A - a specific recipe Ingredients:

| acetophenone | 21.06% by weight | thiourea | 4.32% |
|---|---|---|---|
| 37% formaldehyde | 36.04% | ethylene glycol | 9.28% |
| 37% HCl | 4.84% | isopropanol | 24.45% |

To a reactor equipped with stirrer, thermometer, reflux condenser, and heater was charged the thiourea, followed by the formaldehyde solution. When the thiourea had dissolved, the acetophenone and ethylene glycol were added, followed by the hydrochloric acid. The rapidly stirred emulsion was warmed to 90° C. and held at that temperature for 2 hours to prevent collection of the formaldehyde in the condenser. Then the reaction mixture was refluxed at 95° C. and after 6 hours became clear. The solution became cloudy again after a few hours. After a total of 12 hours of reflux, the cloudy solution was clarified by the addition of the isopropanol. On standing several days at room temperature some solid precipitated, but could be redissolved by warming.

The above recipe need not be followed precisely. The ingredients may be used in the following ranges: acetophenone 10% to 40%; thiourea 1% to 10%; formaldehyde in 37% solution 25% to 50%, although the equivalent amount of formaldehyde may be used in the form of paraformaldehyde; ethylene glycol 5% to 20%—note that propylene glycol or butanol may be substituted; 37% HCl 1% to 10%, and isopropanol 10% to 40%.

We find that acetone, mesityl oxide, cyclohexanone, benzalacetone, or isophorone may be substituted for the acetophenone on a mole-for-mole basis; generally any monofunctional ketone having 3–9 carbon atoms may be used.

Urea, 1-3-dibutyl-2-thiourea, and/or other alkyl-substituted thioureas may be substituted mole-for-mole for the thiourea, and benzaldehyde or benzalacetone may be substituted for the formaldehyde, also mole for mole. Each of the constituents may vary in concentration more or less in line with the ranges presented above for the preferred ingredients.

While NEODOL 91.8 is preferred, we may use ethoxylated alcohols having from 8 to 12 carbon atoms in place thereof.

Instead of cinnamaldehyde in the preferred composition listed above, we may use p-hydroxycinnamaldehyde, p-methylcinnamaldehyde, p-ethylcinnamaldehyde, p-methoxycinnamaldehyde, p-dimethylaminocinnamaldehyde, p-diethylaminocinnamaldehyde, p-nitrocinnamaldehyde, o-nitrocinnamaldehyde, o-allyloxycinnamaldehyde, 4-(3-propenal)cinnamaldehyde, p-sodium sulfocinnamaldehyde, p-trimethylammoniumcinnamaldehyde sulfate, p-thiocyano-cinnamaldehyde, p-(S-acetyl) thiocinnamaldehyde, p-(S-N,N)-dimethylcarbamoylthio) cinnamaldehyde, α-methylcinnamaldehyde, β-methylcinnamaldehyde, α-butylcinnamaldehyde, α-amylcinnamaldehyde, α-hexylcinnamaldehyde, α-ethyl-p-methylcinnamaldehyde, p-methyl-α-pentylcinnamaldehyde, and other such derivatives of cinnamaldehyde, which may be referred to herein as substituted cinnamaldehydes.

Corrosion tests were run using the following procedure:
1. Pour 100 mls of the test acid into an 8 ounce glass or Teflon jar, add the desired amount or corrosion inhibitor composition and any other additives to be included and stir. In each case reported in Table I, the test acid used was 15% HCl.
2. Place a precleaned and weighed coupon into the jar with the concave side down; place the jar with the lid screwed on loosely in a water bath preheated to the desired temperature. At temperatures above 200° F. the corrosion tests are run in a Chandler Autoclave at pressures of 3500–4000 psi.
3. Leave the coupon in the jar in the heated bath for the desired period of time, remove and rinse off the solution.
4. Air dry the coupon; brush clean with a wire brush to remove corrosion products.
5. Reweigh coupon to nearest 0.001 gram. Report corrosion as weight loss in pounds per square foot.

For each run reported in Table I, three (3) coupons were used; their corrosionn amounts were reported as averages. The inhibitor composition used was the above listed Preferred Composition of specific percentages, i.e. 15% cinnamaldehyde, 15% Neodol 91.8, etc.

TABLE I

| Hours | °F. | Formic Acid | Inhib Conc.,% | Av Corrosion |
|---|---|---|---|---|
| 24 | 150 | none | 0.1 | 0.0135 |
| 24 | 150 | none | 0.2 | 0.0099 |
| 24 | 175 | none | 0.2 | 0.017 |
| 24 | 175 | none | 0.4 | 0.0124 |
| 16 | 200 | none | 0.4 | 0.0162 |
| 16 | 200 | none | 0.6 | 0.015 |
| 6 | 250 | 4% | 0.4 | 0.0158 |
| 6 | 250 | 4% | 0.6 | 0.0167 |
| 6 | 250 | 4% | 0.8 | 0.0162 |
| 6 | 250 | 4% | 0.8 | 0.0185 |
| 6 | 275 | 4% | 0.6 | 0.0163 |
| 6 | 275 | 4% | 0.8 | 0.0158 |
| 6 | 300 | 6% | 1.0 | 0.0176 |

It is seen from the above that our corrosion inhibitor is effective at temperatures of 300° F. or higher. The formic acid is an optional corrosion inhibiting enhancer.

Table II reports the results of similar tests preformed on N-80 Steel:

TABLE II

| Acid Type | Temp °F. | Time (Hrs.) | Conc (gpt) | Formic Acid (gpt) | Corr. Rate #/ft² |
|---|---|---|---|---|---|
| 15% HCl | 150 | 24 | 1.0 | 0 | 0.0135 |
| 15% HCl | 175 | 24 | 2.0 | 0 | 0.0170 |
| 15% HCl | 200 | 16 | 4.0 | 0 | 0.0162 |
| 15% HCl | 250 | 6 | 4.0 | 40 | 0.0158 |
| 15% HCl | 275 | 6 | 6.0 | 40 | 0.0163 |
| 15% HCl | 300 | 6 | 10.0 | 60 | 0.0176 |
| 28% HCl | 150 | 24 | 4.0 | 0 | 0.0093 |
| 28% HCl | 175 | 16 | 6.0 | 0 | 0.0287 |
| 28% HCl | 200 | 16 | 20.0 | 0 | 0.0169 |
| 28% HCl | 225 | 6 | 10.0 | 60 | 0.0092 |
| 28% HCl | 250 | 6 | 10.0 | 20 | 0.0126 |
| 28% HCl | 275 | 6 | 10.0 | 60 | 0.0117 |
| 28% HCl | 300 | 6 | 10.0 | 60 | 0.0239 |
| 12/3 Mud | 150 | 24 | 2.0 | 0 | 0.0082 |
| 12/3 Mud | 175 | 24 | 1.0 | 0 | 0.0398 |
| 12/3 Mud | 200 | 16 | 6.0 | 0 | 0.0277 |
| 12/3 Mud | 225 | 6 | 6.0 | 0 | 0.0167 |
| 12/3 Mud | 250 | 6 | 8.0 | 20 | 0.0199 |
| 12/3 Mud | 275 | 6 | 10.0 | 40 | 0.0173 |

Table III reports similar experiments with Chrome—13 Steel:

TABLE III

| Acid Type | Temp °F. | Time (Hrs.) | Conc (gpt) | Formic Acid (gpt) | Corr. Rate #/ft² |
|---|---|---|---|---|---|
| 15% HCl | 100 | 24 | 2.0 | 0 | 0.0119 |
| 15% HCl | 125 | 24 | 2.0 | 0 | 0.0113 |
| 15% HCl | 150 | 24 | 4.0 | 0 | 0.0174 |
| 15% HCl | 175 | 24 | 4.0 | 0 | 0.0146 |
| 15% HCl | 200 | 16 | 10.0 | 0 | 0.031 |
| 15% HCl | 225 | 6 | 10.0 | 20 | |
| 15% HCl | 250 | 6 | 6.0 | 20 | 0.0292 |
| 15% HCl | 275 | 6 | 16.0 | 40 | 0.0317 |
| 15% HCl | 300 | 6 | 20.0 | 60 | 0.0291 |
| 28% HCl | 100 | 24 | 4.0 | 0 | 0.0103 |
| 28% HCl | 125 | 24 | 4.0 | 0 | 0.0227 |
| 28% HCl | 150 | 24 | 8.0 | 0 | 0.0158 |
| 28% HCl | 175 | 16 | 8.0 | 0 | 0.0125 |
| 28% HCl | 200 | 16 | | | |
| 28% HCl | 225 | 6 | 10.0 | 80 | 0.0148 |
| 28% HCl | 250 | 6 | 25.0 | 60 | 0.0277 |
| 12/3 Mud | 100 | 24 | 2.0 | 0 | 0.0107 |
| 12/3 Mud | 125 | 24 | 2.0 | 0 | 0.0117 |

TABLE III-continued

| Acid Type | Temp °F. | Time (Hrs.) | Conc (gpt) | Formic Acid (gpt) | Corr. Rate #/ft$^2$ |
|---|---|---|---|---|---|
| 12/3 Mud | 150 | 24 | 4.0 | 0 | 0.0175 |
| 12/3 Mud | 175 | 24 | 6.0 | 0 | 0 0176 |
| 12/3 Mud | 200 | 16 | 6.0 | 0 | 0.0277 |

Results of similar experiments using Chrome 2205 are reported in Table IV:

TABLE IV

| Acid Type | Temp °F. | Time (Hrs.) | Conc (gpt) | Formic Acid (gpt) | Corr. Rate #/ft$^2$ |
|---|---|---|---|---|---|
| 15% HCl | 125 | 16 | 4.0 | 0 | 0.014 |
| 15% HCl | 125 | 6 | 4.0 | 0 | 0.0079 |
| 15% HCl | 150 | 6 | 8.0 | 0 | 0.0235 |
| 28% HCl | 100 | 24 | 2.0 | 0 | 0.0084 |
| 28% HCl | 125 | 24 | 6.0 | 0 | 0.0059 |
| 28% HCl | 150 | 6 | 8.0 | 0 | 0.0064 |
| 28% HCl | 175 | 6 | 14.0 | 0 | 0.0082 |
| 12/3 Mud | 125 | 6 | 8.0 | 0 | 0.0127 |
| 12/3 Mud | 150 | 6 | 10.0 | 0 | 0.3197 |

Thus it is seen that our invention comprises a composition useful for inhibiting corrosion of ferrous metals by acidic solutions comprising, by weight, (a) about 10% to about 30% cinnamaldehyde or substituted cinnamaldehyde, (b) about 20% to about 50% ethylene glycol, (c) about 5% to about 20% C$_{8-12}$ ethoxylated alcohols, and (d) about 1% to about 15% of a composition comprising about 10% to about 40% isopropanol and a reaction product [based on the total composition in this section (d)] of about 10% to about 40% of a ketone having 3–9 carbon atoms, about 1% to about 10% urea, thiourea or an alkyl-substituted thiourea, about 25% to about 50 benzaldehyde or formaldehyde calculated as a 37% solution, about 1% to about 10% HCl, said reaction being conducted in the presence of about 5% to about 20% ethylene glycol.

Generally our composition will be effective in inhibiting corrosion in almost any concentration—that is, if a very small amount is used, it will be effective to a small degree. However, we prefer to use 0.1% to 1.0% based on the hydrochloric acid solution, but as muchh as 5% may be used.

We claim:

1. Composition useful for inhibiting corrosion of ferrous metals by acidic solutions comprising, by weight, (a) about 10% to about 30% cinnamaldehyde or substituted cinnamaldehyde, (b) about 20% to about 50% ethylene glycol (c) about 5% to about 20% C$_{8-12}$ ethoxylated alcohols, and (d) about 1% to about 15% of a composition comprising about 10% to about 40% isopropanol and a reaction product (based on the total composition in this section (d)) of about 10% to about 40% of a ketone having 3–9 carbon atoms, about 1% to about 10% urea, thiourea or an alkyl-substituted thiourea, about 25% to about 50% benzaldehyde or formaldehyde calculated as a 37% solution, about 1% to about 10% HCl, said reaction being conducted in the presence of about 5% to about 20% ethylene glycol by warming the reactants in a vessel equipped with a reflux condenser, at a temperature slightly below that at which formaldehyede or benzaldehyde would collect in the condenser, and then refluxing the reaction mixture for at least six hours.

2. Composition of claim 1 wherein the reaction product of component (d) is a reaction product of about 10% to about 40% acetophenone, about 1% to about 10% thiourea, about 25% to about 50% formaldehyde calculated as a 37% solution, about 1% to about 10% HCl, and about 10% to about 40% isopropanol, based on the total composition of component (d).

3. Composition of claim 1 including, based on the overall composition, an additional 1% to about 5% isopropanol.

4. Composition of claim 1 including up to about 50% formic acid.

5. Composition of claim 1 wherein said ketone is acetophenone.

6. Composition of claim 1 wherein said ketone is acetone.

7. Composition of claim 1 wherein said ketone is mesityl oxide.

8. Composition of claim 1 wherein said ketone is isophorone.

9. Composition of claim 1 wherein said ketone is cyclohexanone.

10. Composition of claim 1 wherein said ketone is benzalacetone.

11. Composition useful for acidizing wells comprising hydrochloric acid and an amount of a composition of claim 1 effective to inhibit corrosion by said hydrochloric acid.

12. Composition of claim 11 wherein said composition of claim 1 is present in an amount from 0.1% to 1.0% of the overall composition.

13. Method of acidizing a well comprising treating said well with a composition of claim 11.

* * * * *